No. 883,863. PATENTED APR. 7, 1908.
T. H. CURTIS.
CAR TRUCK.
APPLICATION FILED JUNE 10, 1907.
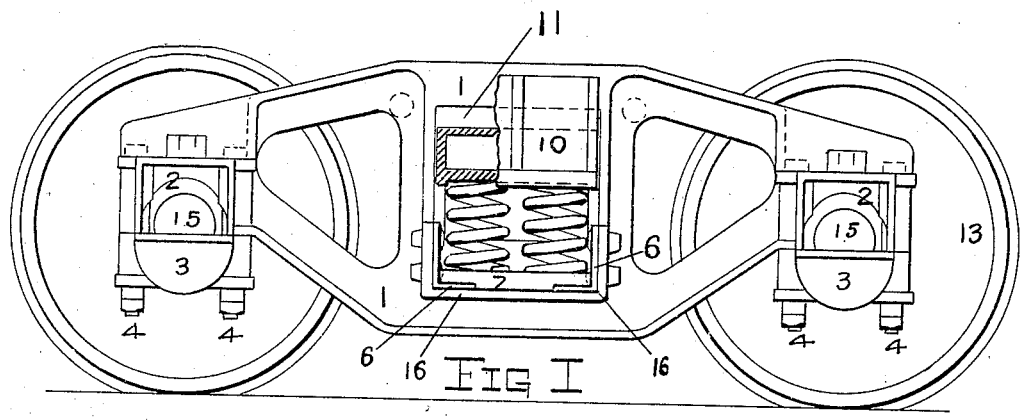
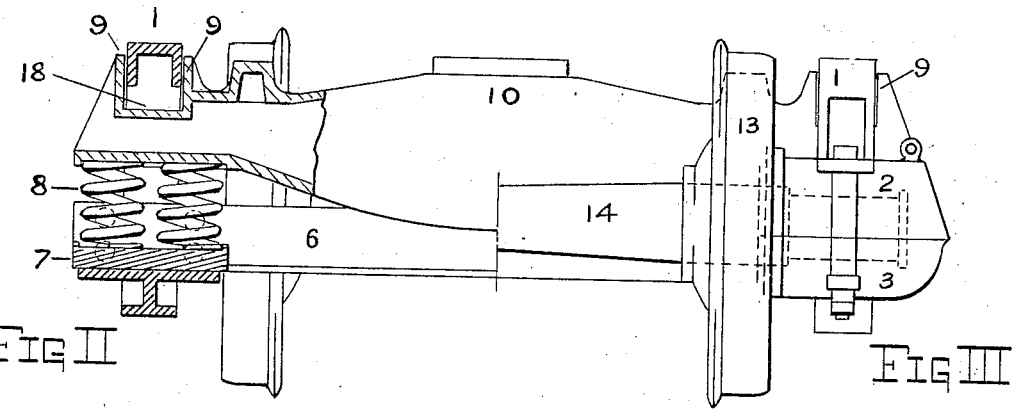
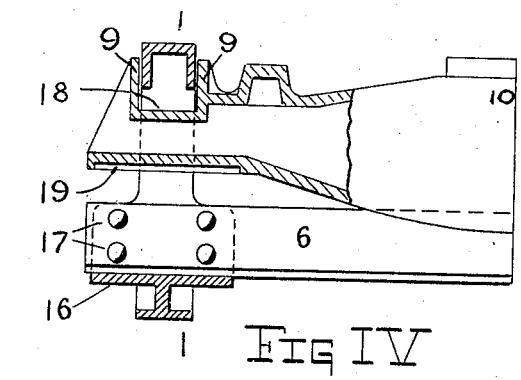
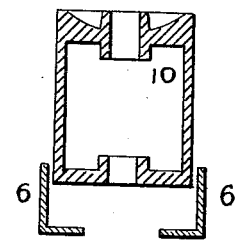
Witnesses
H. C. McLellen
Ward Barnum
Inventor
Theodore H. Curtis

UNITED STATES PATENT OFFICE.

THEODORE H. CURTIS, OF LOUISVILLE, KENTUCKY.

CAR-TRUCK.

No. 883,863.

Specification of Letters Patent.

Patented April 7, 1908

Application filed June 10, 1907. Serial No. 378,325.

*To all whom it may concern:*

Be it known that I, THEODORE H. CURTIS, a citizen of the United States, and a resident of the city of Louisville, in the county of Jefferson and State of Kentucky, have invented certain new and useful Improvements in Car-Trucks, of which the following is a full, clear, and exact description.

My invention relates to car-trucks, and especially to cast integral or built-up side-frames and the truck-bolster, and has for its principal objects the following: the integral side-frame with provision for inserting the integral truck-bolster and bolster-guides, the rigidly securing of the side-frames together by the spring-beam which hold the side-frames in proper alinement, the removable oil-cellars to permit the removal of the car-wheels and axles from the side-frames without removing any part except the oil-cellars, the construction of a car-truck embodying the integral side-frames and integral truck-bolster, thereby eliminating the use of bolts excepting those securing the oil-cellars, and also the providing of means for keeping the side-frames substantially in alinement and rigidly held together and still permitting of quick removal of the car-wheels and axles or the truck-bolster which is accomplished by means hereinafter described and particularly pointed out in the claims.

In the accompanying drawings, forming a part of this specification and wherein like symbols refer to like parts wherever they occur, Figure I is a full side view of the car-truck showing a small section at the corner of the truck bolster. Fig. II is a sectional view through center of the car-truck, and Fig. III is a full end view of the car-truck.
Fig. IV is a sectional view through the center of the truck-bolster and side-frame showing spring-beam with the bolster springs and spring seat removed. Fig. V is a sectional view through the center of the truck-bolster and spring-beam showing the respective clearance of same.

The side-frame, 1, with the bolster-opening, 11, therein, is made with the journal-box-saddles, 2, cast integral with the side-frame and the oil-cellars, 3, attached by the bolts, 4. Said bolts being adjustable and so located that the tightening of the adjustable bolts will close the journal-box-saddles and oil-cellars together to exclude the dust from entering the joints between the journal-box-saddles and the oil-cellars and also preventing vibration or rattling of the oil-cellars. The adjustable bolts are located to tighten or draw across the said joints in such a manner that the tightening of said adjustable bolts will cause the journal-box-saddles and oil-cellars to close together and form a secure dust proof non-vibrating joint. The adjustable bolts are preferably made with screw threads for adjustment, but any other substantial holding may be used in lieu of the bolts. If desired the oil-cellars can be attached to the side-frames when same extend over the journal-box-saddles, 2. The journal-box saddles, 2, and the oil-cellars, 3, are preferably formed with the well known Master Car Builders' standard dimensions and to receive the Master Car Builders' contained parts, such as the journal bearing and the journal-bearing-key and axle dust guard; also the journal-box-lid. The side-frames, 1, are held rigidly together by the spring-beam, 6, with rivets, 17, securing the spring-beam to the extended flanges, 16, of the side-frames.

The truck-bolster, 10, is made with bolster guides, 9, and spring-seats, 19. The width and height of the truck-bolster is less than the width and height of the opening, 11, in the side-frames, thereby permitting the insertion of the truck-bolster in the opening, 11, and the truck-bolster is then raised and engages the bolster-guides, 9, with the top or compression bar of the side-frames, 1.

When the bolster-springs, 8, are applied under the spring-seat, 19, and resting on the lower spring seats, 7, the truck bolster will be held in position and secured to resist end thrusts by the bolster-guides, 9, transmitting the thrust to the bolster-guide bearings on the sides of the compression-bar of the side-frame, 1, and to resist side thrusts by the sides of the truck-bolster transmitting the thrust to the vertical sides of opening, 11, in the side-frame. The truck-bolster can be removed at any time by raising same until the frame seats, 18, strike the bottom of the compression bars of the side-frames, which will relieve all weight on the bolster-springs and permit their removal. When the bolster-springs are removed the truck-bolster can be lowered until the bolster-guides, 9, disengage the compression-bars of the side-frames and the truck-bolster can be taken out of the side-frames end wise. The lower spring-seats, 7, rest upon the extended flanges, 16, of the side-frames, also upon the spring-beam, 6. The car-wheels, 13, are mounted on axles, 14. The journals, 15, revolve under the journal-box saddles, 2.

Obviously the construction of the car-truck admits of modifications within the scope of my invention, and therefore, I do not wish to be limited to the specific construction of my invention: For example, although a cast metal side frame is shown in the drawing the invention is equally applicable to a built-up side-frame when the journal-box-saddles are permanently secured to the side-frame, or the truck bolster can be made of the built-up design and be substituted for the truck bolster cast integral.

What I claim as my invention, and desire to secure by Letters Patent, is:

1. In a railway car-truck, the combination of the side-frame having bolster-openings therein to receive the ends of the truck-bolster, that portion of the said side-frame over said bolster-openings being provided with bolster-guide bearings and a truck-bolster having upstanding bolster-guides to coöperate with said bolster-guide bearings, the latter and said bolster-guides constituting the means for preventing endwise shifting of the truck-bolster, and journal-box-saddles at ends of each side-frame and removable oil-cellars attached to journal-box-saddles by bolts, said bolts being adjustable and so located that the tightening of the adjustable bolts will close the journal-box-saddles and oil-cellars together to exclude the dust from entering the joints between the journal-box-saddles and oil-cellars, substantially as described.

2. In a railway car-truck, the combination of the side-frame having bolster-openings therein to receive the ends of the truck-bolster, that portion of the said side-frames over said bolster-openings being provided with bolster-guide bearings and a truck-bolster having upstanding bolster-guides to coöperate with said bolster-guide bearings, the latter and said bolster-guides constituting the means for preventing endwise shifting of the truck-bolster, and journal-box-saddles at ends of each side-frame and removable oil-cellars attached to said side-frames by bolts, said bolts being adjustable and so located that the tightening of the adjustable bolts will close the journal-box-saddles and oil-cellars together to exclude the dust from entering the joints between the journal-box-saddles and oil-cellars, substantially as described.

In testimony whereof I affix my signature in the presence of two subscribing witnesses:

THEODORE H. CURTIS.

Witnesses:
H. C. McLELLEN,
WARD BARNUM.